Patented July 28, 1936

2,048,898

UNITED STATES PATENT OFFICE 2,048,898

CHROMIFEROUS DYESTUFFS AND PROCESS OF MAKING SAME

Fritz Straub, Basel, Switzerland, Ernst Brunner, Manchester, England, and Willi Widmer, Basel, Switzerland, assignors to "Society of Chemical Industry in Basle", Basel, Switzerland No Drawing. Application June 7, 1933, Serial No. 674,770. In Switzerland July 20, 1932

20 Claims. (Cl. 260—12)

This invention relates to the manufacture of dyestuffs by treating, in the absence of an organic base, with an agent yielding chromium an azo-dyestuff of the general formula

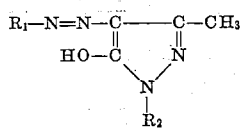

wherein $R_1$ is an aryl radical which in the one ortho-position to the azo-bridge contains a carboxyl-group and in the other ortho-position to the azo-bridge contains no hydroxyl-group and $R_2$ is hydrogen, alkyl or aryl, and wherein at least one of the aryl residues must contain at least one sulfonic group as a substituent.

The parent dyestuffs for the manufacture may be made by coupling a diazotized ortho-aminoarylcarboxylic acid, which contains in the ortho-position to the amino-group no hydroxyl-group, with one of the various 3-methylpyrazolones, the ortho-aminoarylcarboxylic acid or the 3-methylpyrazolone being so selected that the azo-dyestuff obtained contains at least one sulfo-group.

As suitable diazo-components for making these parent dyestuffs there come into question, for example, the diazo-compounds from 2-aminobenzene - 1 - carboxylic acid, 2-amino-naphthalene-3-carboxylic acid, 1-aminonaphthalene-2-carboxylic acid, 5-chloro- or 5-bromo-2-aminobenzene-1-carboxylic acid, 4- or 5-sulfo-2-aminobenzene-1-carboxylic acid, 4-methoxy- or 4-ethoxy-2-aminobenzene-1-carboxylic acid, 4-hydroxy-2-aminobenzene-1-carboxylic acid, 4-nitro-2-aminobenzene-1-carboxylic acid, 3-sulfo-5-chloro-2-aminobenzene-1-carboxylic acid and 3- or 4-sulfo-5-methyl-2-aminobenzene-1-carboxylic acid.

As coupling components for making these parent dyestuffs there come into question, for example, the 3-methyl-5-pyrazolone, the 1-ethyl-3-methyl-5-pyrazolone, the 1:3-dimethyl-5-pyrazolone and also the 1-aryl-3-methyl-5-pyrazolones, which, for example, can be made from the following amines: aniline, toluidine, xylidine, 1- or 2-naphthylamine, aniline-2,5-disulfonic acid, 2-methyl-4-sulfo-aniline, 2-chloraniline, 2-chloraniline-5-sulfonic acid, sulfanilic acid, 2,4-dimethyl-1-aminobenzene-6-sulfonic acid metanilic acid, 2-methyl-5-sulfo-aniline, 3-carboxy-4-hydroxy - 1 - aminobenzene, 2-naphthylamine-6-sulfonic acid, 4- or 5-sulfo-2-aminobenzene-1-carboxylic acid, 2-hydroxy-3-amino-5-sulfobenzene-1-carboxylic acid and 2-hydroxy-3-sulfo-5-aminobenzene-1-carboxylic acid.

As agents yielding chromium with which the azo-dyestuffs of the above general formula are treated, may be used both inorganic chromium salts, such as chromium fluoride, chromium sulfite, chromium chloride and organic chromium salts, such as chromium acetate or chromium formate.

The dyestuff may be treated with the agent yielding chromium in acid, neutral or alkaline medium, with or without an addition other than an organic base and in the open or under pressure.

The chromiferous dyestuffs obtained in accordance with the invention dye very various tints. They are characterized by remarkable fastness, particularly to milling and light, and also by very good levelling properties. The dyestuffs may be used for dyeing material of any kind, such as wool, silk, cotton, leather, artificial silk, whether derived from regenerated cellulose or cellulose esters or ethers, and lacquers made from a cellulose base or a natural or artificial resin base; or they may be used as pigments or in printing.

The following examples illustrate the invention, the parts being by weight:—

Example 1

25.3 parts of the azo-dyestuff of the formula

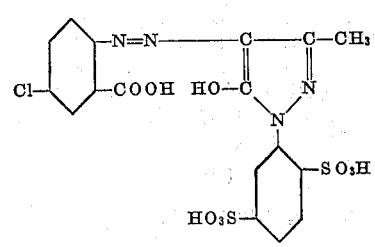

from diazotized 5-chloro-2-aminobenzene-1-carboxylic acid and 1-(2',5'-disulfo-)phenyl-3-methyl-5-pyrazolone are dissolved in 200 parts of water and the solution is boiled in a reflux apparatus for about 12 hours with a solution of chromium fluoride, containing 4.6 parts of chromium oxide. The excess of chromium is precipitated in the form of hydrate from the hot solution by means of alkali and filtered, and the filtrate is evaporated to dryness. The chromium compound thus obtained is a dark yellow powder which dissolves in water to a yellow solution. It dyes wool in an acid bath gold-yellow tints and the dyeing has good fastness to milling, very good uniformity and excellent fastness to light.

Example 2

24.3 parts of the azo-dyestuff of the formula

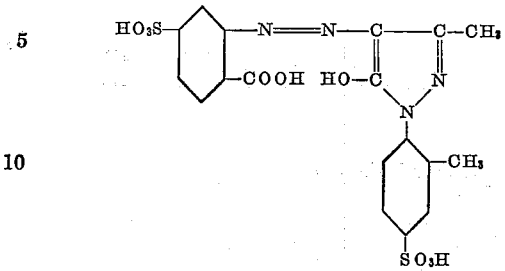

from diazotized 4-sulfo-2-aminobenzene-1-carboxylic and 1-(2'-methyl-4'-sulfo-)phenyl-3-methyl-5-pyrazolone are dissolved in 200 parts of water and the solution is boiled in a reflux apparatus with a solution of chromium fluoride corresponding with 4.6 parts of chromium oxide, for about 12 hours. The chromium compound thus obtained may be salted out. When dry, it is a dark yellow powder, soluble in water to a yellow solution. It dyes wool in an acid bath reddish-yellow tints of good fastness to milling, characteristic uniformity and quite outstanding fastness to light.

Dyestuffs having similar properties are obtained when the chromium operation is conducted with other chromium salts.

Example 3

A solution of 21.6 parts of the azo-dyestuff of the formula

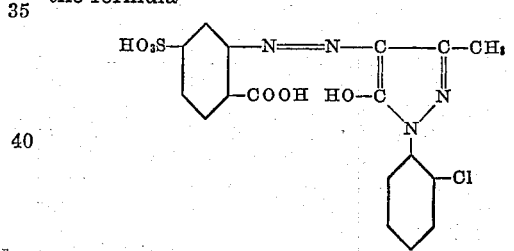

from diazotized 4-sulfo-2-aminobenzene-1-carboxylic acid and 1-(2'-chloro-)phenyl-3-methyl-5-pyrazolone in 400 parts of water is mixed with a solution of chromium fluoride, corresponding with 4.6 parts of chromium oxide, and the mixture is boiled for about 12 hours in a reflux apparatus. The chromium compound is salted out. When dry it is a dark yellow powder, soluble in water to a yellow solution and dyeing wool in an acid bath reddish-yellow tints characterized by a remarkable fastness to light.

Example 4

25.3 parts of the azo-dyestuff of the formula

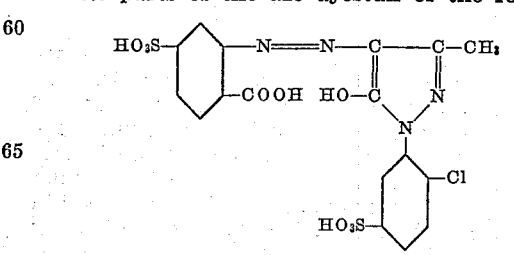

from diazotized 4-sulfo-2-aminobenzene-1-carboxylic acid and 1-(2'-chloro-5'-sulfo-)-3-methyl-5-pyrazolone are dissolved in about 200 parts of water and, after addition of 4.6 parts of chromium oxide in the form of a chromium sulfate solution, the whole is boiled for several hours in a reflux apparatus. The chromed dyestuff is salted out. After drying, it is a dark yellow powder, soluble in water, in sodium carbonate solution of 10 per cent. strength, in caustic soda solution of 10 per cent. strength and in concentrated sulfuric acid to a yellow solution in each case. It dyes wool in an acid bath reddish-yellow tints of good fastness to light.

Example 5

18.9 parts of the azo-dyestuff of the formula

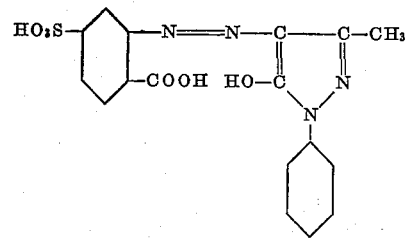

from diazotized 4-sulfo-2-aminobenzene-1-carboxylic acid and 1-phenyl-3-methyl-5-pyrazolone are dissolved in 500 parts of water and the solution is boiled for several hours in a reflux apparatus with chromium fluoride corresponding with 4.6 parts of chromium oxide. The chromed dyestuff is then salted out. It dissolves in water to a yellow solution and dyes wool in an acid bath reddish tints of good properties of fastness.

Example 6

A concentrated aqueous solution of 22.9 parts of the azo-dyestuff of the formula

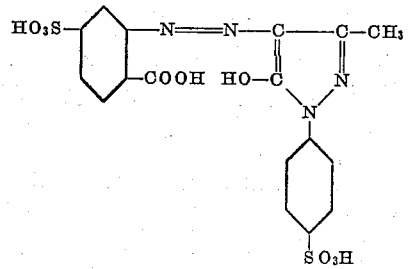

from diazotized 4-sulfo-2-aminobenzene-1-carboxylic acid and 1-(4'-sulfo-)phenyl-3-methyl-5-pyrazolone is heated to boiling in a reflux apparatus for several hours with 4.6 parts of chromium oxide in the form of chromic oxalate. The chromium which has not been taken up by the dyestuff, is separated by addition of alkali and the filtrate is evaporated to dryness. The dark yellow powder thus obtained dissolves in water to a yellow solution. The chromed dyestuff dyes wool in an acid bath reddish-yellow tints which are very uniform and excellently fast to light, as well as of good fastness to milling.

Chromium compounds dyeing very fast reddish-yellow tints are also obtained by treating with an agent yielding chromium the azo-dyestuff from diazotized 2-aminobenzene-1-carboxylic acid and 1-(2'-methyl-4'-sulfo-)phenyl-3-methyl-5-pyrazolone; from diazotized 4-sulfo-2-aminobenzene-1-carboxylic acid and 1-(2',4'-dimethyl-6'-sulfo-)phenyl-3'-methyl-5-pyrazolone; from diazotized 4-sulfo-2-aminobenzene-1-carboxylic acid and 1-(3'-sulfo-)phenyl-3-methyl-5-pyrazolone, and from diazotized 4-sulfo-2-aminobenzene-1-carboxylic acid and 1-(2'-methyl-5'-sulfo-)phenyl-3-methyl-5-pyrazolone.

Example 7

The azo-dyestuff of the formula

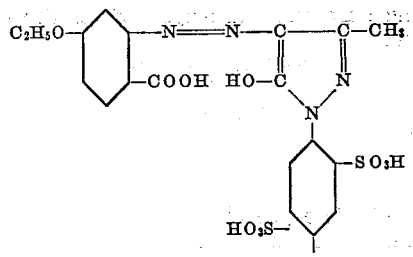

made in the usual manner from 181 parts of 4-ethoxy-2-amino-1-benzoic acid and 340 parts of 1-(2',5'-disulfo-)phenyl-3-methyl-5-pyrazolone together with 5000 parts of water and 800 parts of a solution of chromium sulfate, corresponding with 84 parts of chromium oxide, are heated together to boiling for a long time in a reflux apparatus. When chroming is complete, the dyestuff solution is made feebly alkaline with sodium carbonate, filtered and the filtrate evaporated to dryness in a vacuum. The dyestuff thus obtained is a yellow-brown powder soluble in water, sodium carbonate solution of 10 per cent. strength, caustic soda solution of 10 per cent. strength and concentrated sulfuric acid to a yellow solution in each case. It dyes wool in a sulfuric acid bath very uniform greenish yellow tints. The dyeings are characterized by a very good fastness to light and a good fastness to milling.

What we claim is:—

1. Process for the manufacture of chromiferous dyestuffs, comprising treating, in the absence of organic bases, with agents yielding chromium, azo-dyestuffs of the general formula

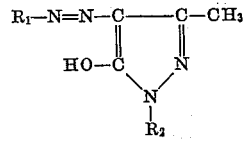

wherein $R_1$ is an aryl radical containing in the one ortho-position to the azo-bridge a carboxyl-group and in the other ortho-position to the azo-bridge no hydroxyl-group, $R_2$ is a member of the group consisting of hydrogen, alkyl and aryl, and wherein at least one of the aryl radicals contains at least one sulfonic group as a substituent.

2. Process for the manufacture of chromiferous dyestuffs, comprising treating, in the absence of organic bases, with agents yielding chromium, azo-dyestuffs of the general formula

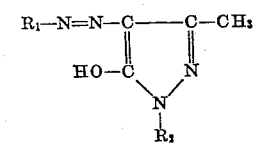

wherein $R_1$ is a sulfonated aryl radical containing a carboxyl-group in one ortho-position to the azo-bridge and no hydroxyl-group in the other ortho-position to the azo-bridge, and $R_2$ is a member of the group consisting of hydrogen, alkyl and aryl.

3. Process for the manufacture of chromiferous dyestuffs, comprising treating, in the absence of organic bases, with agents yielding chromium, azo-dyestuffs of the general formula

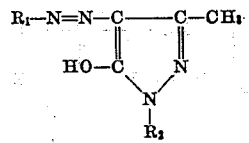

wherein $R_1$ is an aryl radical containing a carboxyl-group in one ortho-position to the azo-bridge and no hydroxyl-group in the other ortho-position to the azo-bridge, and $R_2$ is a sulfonated aryl radical.

4. Process for the manufacture of chromiferous dyestuffs, comprising treating, in the absence of organic bases, with agents yielding chromium, azo-dyestuffs of the general formula

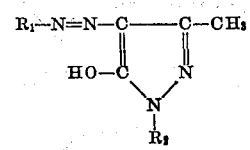

wherein $R_1$ is a phenyl radical containing in the one ortho-position to the azo-bridge a carboxyl-group and in the other ortho-position to the azo-bridge no hydroxyl-group, $R_2$ is a member of the group consisting of hydrogen, alkyl and phenyl, and wherein at least one of the phenyl radicals contains at least one sulfonic group as a substituent.

5. Process for the manufacture of chromiferous dyestuffs, comprising treating, in the absence of organic bases, with agents yielding chromium, azo-dyestuffs of the general formula

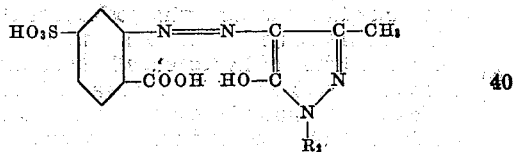

wherein $R_2$ is a member of the group consisting of hydrogen, alkyl and phenyl.

6. Process for the manufacture of chromiferous dyestuffs, comprising treating in the absence of organic bases, with agents yielding chromium, azo-dyestuffs of the general formula

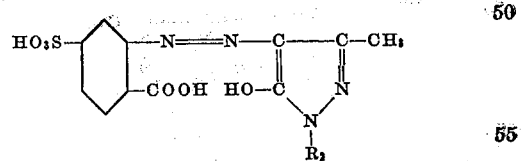

wherein $R_2$ is a phenyl radical.

7. Process for the manufacture of a chromiferous dyestuff, comprising treating, in the absence of organic bases, with agents yielding chromium, the azo-dyestuff of the formula

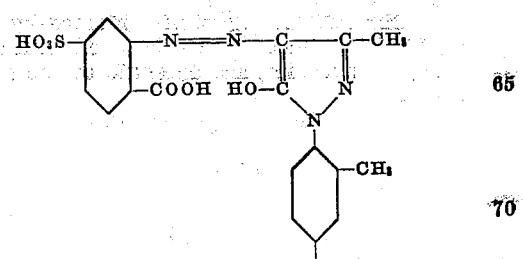

8. Process for the manufacture of chromiferous dyestuffs, comprising treating, in the absence of organic bases, with agents yielding chromium, the azo-dyestuff of the general formula

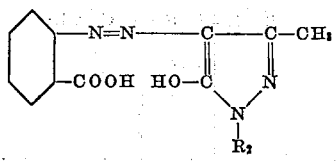

wherein R₂ is a sulfonated aryl radical.

9. Process for the manufacture of chromiferous dyestuffs, comprising treating, in the absence of organic bases, with agents yielding chromium, the azo-dyestuff of the formula

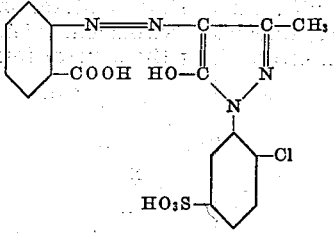

10. Chromiferous dyestuffs obtained by treating, in the absence of organic bases, with agents yielding chromium, azo-dyestuffs of the general formula

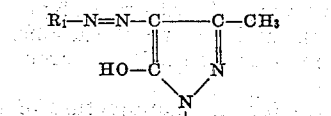

wherein R₁ is an aryl radical containing in the one ortho-position to the azo-bridge a carboxyl group and in the other ortho-position to the azo-bridge no hydroxyl-group, R₂ is a member of the group consisting of hydrogen, alkyl and aryl, and wherein at least one of the aryl radicals contains at least one sulfonic group as a substituent, which products are dark yellow to yellow brown powders dissolving in water to yellow solutions, and dyeing the fiber golden yellow to reddish yellow tints of very good fastness properties.

11. Chromiferous dyestuffs obtained by treating, in the absence of organic bases, with agents yielding chromium, azo-dyestuffs of the general formula

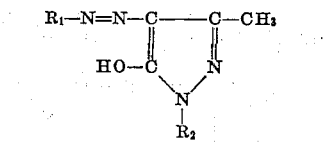

wherein R₁ is a sulfonated aryl radical containing a carboxyl-group in one ortho-position to the azo-bridge and no hydroxyl-group in the other ortho-position to the azo-bridge, and R₂ is a member of the group consisting of hydrogen, alkyl and aryl.

12. Chromiferous dyestuffs obtained by treating, in the absence of organic bases, with agents yielding chromium, azo-dyestuffs of the general formula

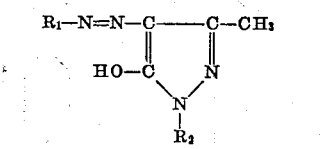

wherein R₁ is an aryl radical containing a carboxyl-group in one ortho-position to the azo-bridge and no hydroxyl-group in the other ortho-position to the azo-bridge, and R₂ is a sulfonated aryl radical.

13. Chromiferous dyestuffs obtained by treating, in the absence of organic bases, with agents yielding chromium, azo-dyestuffs of the general formula

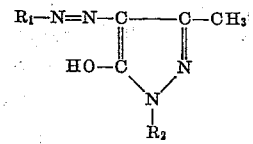

wherein R₁ is a phenyl radical containing in the one ortho-position to the azo-bridge a carboxyl-group and in the other ortho-position to the azo-bridge no hydroxyl-group, R₂ is a member of the group consisting of hydrogen, alkyl and phenyl, and wherein at least one of the phenyl radicals contains at least one sulfonic group as a substituent, which products are dark yellow to yellow brown powders dissolving in water to yellow solutions, and dyeing the fiber golden yellow to reddish yellow tints of very good fastness properties.

14. Chromiferous dyestuffs obtained by treating, in the absence of organic bases, with agents yielding chromium, azo-dyestuffs of the general formula

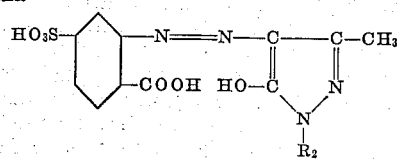

wherein R₂ is a member of the group consisting of hydrogen, alkyl and phenyl, which products are dark yellow powders dissolving in water to yellow solutions and dyeing the fiber reddish yellow tints of very good fastness properties.

15. Chromiferous dyestuffs obtained by treating, in the absence of organic bases, with agents yielding chromium, azo-dyestuffs of the general formula

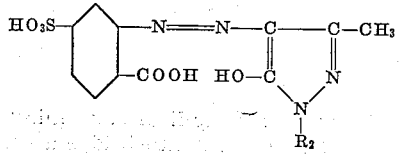

wherein R₂ is a phenyl radical, which products are dark yellow powders dissolving in water to yellow solutions and dyeing the fiber reddish yellow tints of very good fastness properties.

16. A chromiferous dyestuff obtained by treating, in the absence of organic bases, with agents yielding chromium, an azo-dyestuff of the formula

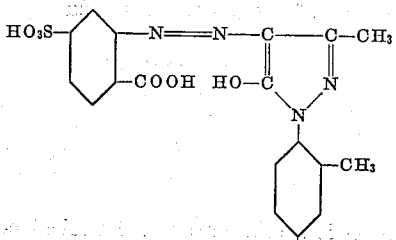

which product is a dark yellow powder dissolving in water to a yellow solution and dyeing the fiber reddish yellow tints of very good fastness properties.

17. Chromiferous dyestuffs obtained by treating, in the absence of organic bases, with agents yielding chromium, azo-dyestuffs of the general formula

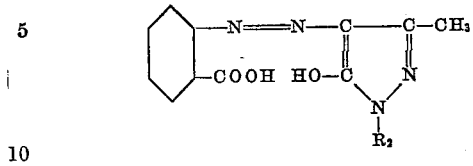

wherein $R_2$ is a sulfonated aryl radical.

18. Chromiferous dyestuffs obtained by treating, in the absence of organic bases, with agents yielding chromium, the azo-dyestuff of the formula

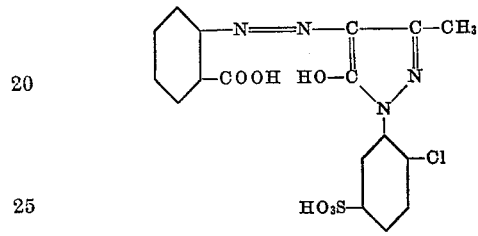

19. Process for the manufacture of a chromiferous dyestuff, comprising treating, in the ab-sence of organic bases, with agents yielding chromium, the azo-dyestuff of the formula

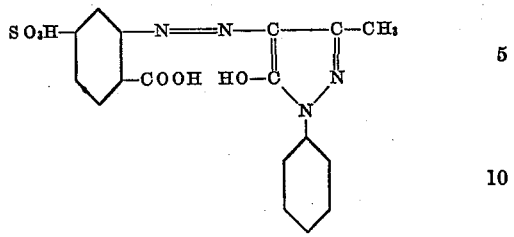

20. Chromiferous dyestuffs obtained by treating, in the absence of organic bases, with agents yielding chromium, the azo-dyestuff of the formula

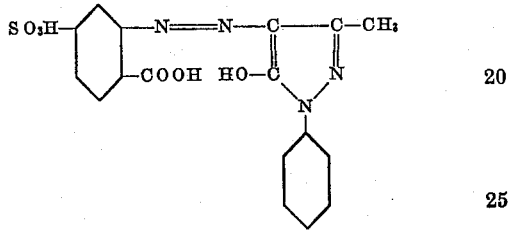

FRITZ STRAUB.
ERNST BRUNNER.
WILLI WIDMER.